United States Patent
Boulard et al.

(10) Patent No.: US 11,007,736 B2
(45) Date of Patent: May 18, 2021

(54) MAXIMIZING THE DURATION OF GUIDANCE MEANS IN TIRE VULCANIZATION SYSTEMS WITHOUT DISTURBING THERMAL STABILITY

(71) Applicant: COMPAGNIE GENERALE DES ETABLISSEMENTS MICHELIN, Clermont-Ferrand (FR)

(72) Inventors: Pierre-Yves Boulard, Clermont-Ferrand (FR); Miguel Torres-Castellano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 303 days.

(21) Appl. No.: 16/086,112

(22) PCT Filed: Feb. 27, 2017

(86) PCT No.: PCT/EP2017/054473
§ 371 (c)(1),
(2) Date: Sep. 18, 2018

(87) PCT Pub. No.: WO2017/162407
PCT Pub. Date: Sep. 28, 2017

(65) Prior Publication Data
US 2020/0298516 A1    Sep. 24, 2020

(30) Foreign Application Priority Data
Mar. 21, 2016    (FR) .................... 1652394

(51) Int. Cl.
*B29D 30/06* (2006.01)
*B29L 30/00* (2006.01)

(52) U.S. Cl.
CPC ..... *B29D 30/0662* (2013.01); *B29D 30/0654* (2013.01); *B29D 30/0603* (2013.01); *B29D 2030/0657* (2013.01); *B29D 2030/0669* (2013.01); *B29D 2030/0677* (2013.01); *B29L 2030/00* (2013.01)

(58) Field of Classification Search
CPC ........ B29D 30/0662; B29D 2030/0657; B29D 2030/0669
See application file for complete search history.

(56) References Cited

U.S. PATENT DOCUMENTS

| 4,747,765 | A | 5/1988 | Siegenthaler et al. |
| 5,683,643 | A | 11/1997 | Laurent |
| 7,435,069 | B2 | 10/2008 | Okada et al. |
| 10,124,550 | B2 * | 11/2018 | Massoptier-David ....... B29D 30/0662 |
| 2004/0247717 | A1 | 12/2004 | Okada et al. |

FOREIGN PATENT DOCUMENTS

EP    0 686 492 A1    12/1995

OTHER PUBLICATIONS

International Search Report dated Apr. 28, 2017, in corresponding PCT/EP2017/054473 (2 pages).

* cited by examiner

*Primary Examiner* — James P Mackey
(74) *Attorney, Agent, or Firm* — Venable LLP

(57) ABSTRACT

A tire vulcanizing system (100) is provided that optimizes the service life of guidance means and preserves the thermal stability of the vulcanization.

12 Claims, 7 Drawing Sheets

MAXIMIZING THE DURATION OF GUIDANCE MEANS IN TIRE VULCANIZATION SYSTEMS WITHOUT DISTURBING THERMAL STABILITY

TECHNICAL FIELD

The invention is generally directed to tire vulcanization and systems used therefor. More particularly, the invention is directed to maximizing the service life of guidance means that are used in such systems while preserving the thermal stability of the vulcanization.

BACKGROUND

During vulcanization of a tire, one or more tire vulcanizing systems may be employed for use with a tire mold. A principal characteristic of certain vulcanization systems is to place a system of heating and ventilation at the heart of an electric vulcanization system. For example, in an electric press, after a green tire is charged in a mold, a circulation fan that is immersed wholly in a heating medium (typically nitrogen) circulates the heating medium inside a bladder (i.e., one formed from an elastic material such as butyl rubber). A heating means that is also immersed wholly in the heating medium supplies the required heat, thereby causing the bladder to expand and engage an inner wall surface of the tire. Exemplary embodiments of such systems and demonstrations of their use are disclosed by the publications EP0686492 and U.S. Pat. No. 7,435,069.

During vulcanization of tires, lubricants that are commonly used in these installations are generally inert oils such as perfluoropolyether (PFPE) which offer excellent high temperature performance. Although such lubricants mix well with the chemical compounds of the same family, the vulcanization of a tire at high temperatures (e.g., between about 130° C. and about 220° C.) introduces compounds that are mainly hydrocarbon-based oils. These compounds are not miscible with PFPE.

Consequently, prolonged use of these lubricants forms a paste that thickens during each vulcanization cycle. The thickening of the paste increases the viscosity and therefore subjects guidance means (e.g., bearings) to an opposing force which may lead to their immobilization. Thus, solutions are demanded that address immobilization of guidance means and resultant changes in the thermal stability of a tire vulcanization system.

SUMMARY

The invention provides a tire vulcanization system for regulating a temperature of a heating medium such as nitrogen. The system includes a bladder that is disposed within a tire to be vulcanized. The bladder defines a cavity in which the heating medium circulates. A fan and a heater are immersed in the heating medium. The heater has one or more heating elements that supply energy to the heating medium before the heating medium exits the bladder along an output path. A shaft is also provided that is concentric with an axis X-X' of the cavity and driven by a controllable motor. Guidance protection means are positioned in a central portion of the system at or near a center of the bladder and below the fan and the heater. In this configuration, as the heating medium is introduced into the cavity, the fan agitates the heating medium radially outwardly in the direction of the bladder and directs the heating medium toward exits that are positioned obliquely relative to a support that carries the fan.

The heating medium in the cavity may be pressurized at an operating temperature between about 130° C. and about 220° C.

The guidance protection means may include one or more bearings that are positioned in a central portion of the bladder. The bearing can include upper bearings that are disposed proximate the heater and the fan as well as lower bearings. The lower bearings are disposed opposite the upper bearings proximate an egress of the heating medium from one or more conduits. The upper and lower bearings can include at least one of integral protection means and supplemental exterior protection means.

The guidance protection means may include one or more mechanical seals in combination with at least one of the upper bearings and the lower bearings. Each seal includes a stationary ring, a mobile grain and a spring washer that maintains contact therebetween.

The guidance protection means may include the lower bearings and one or more plain bearings that replace the upper bearings and the mechanical seals. The plain bearings are fabricated from a material that undergoes pressure loads at an operating temperature between 130° C. and 220° C.

The guidance protection means may include the upper bearings and at least one joint. The joint includes a generally flexible member that remains in flexible contact with a housing body such that the joint establishes privileged passages that isolate the heating medium to an annular region.

The invention also provides a tire vulcanization system that includes a mold within which a tire is vulcanized.

The invention also provides a method for vulcanizing a tire in a mold for a predetermined duration under pressure.

Other aspects of the disclosed invention will become readily apparent from the following detailed description.

BRIEF DESCRIPTION OF DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Figure 1:
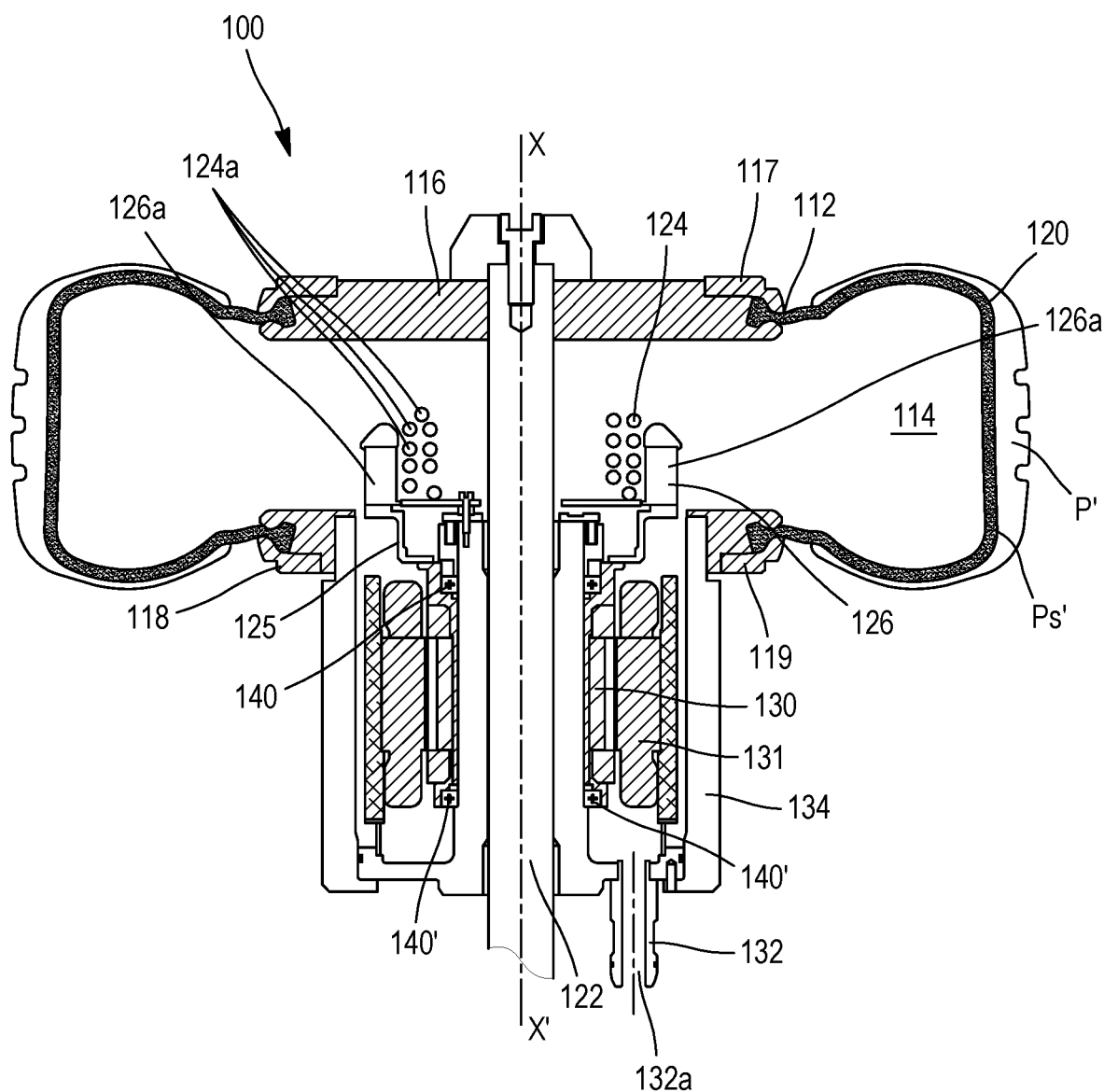
FIG. 1 shows a sectional view of a vulcanization system of the invention.

Reference now will be made in detail to embodiments of the invention, one or more examples of which are illustrated in the drawings. Each example is provided by way of explanation and not by limitation of the presently disclosed invention. Selected combinations of aspects of the disclosed technology correspond to a plurality of different embodiments of the present invention. It will be apparent to those skilled in the art that various modifications and variations can be made in the present invention without departing from the scope or spirit of the invention. For instance, features or steps illustrated or described as part of one embodiment can be used with one or more other embodiments to yield at least one further embodiment. Additionally, certain features may be interchanged with similar devices or features not expressly mentioned which perform the same or similar function. Thus, it is intended that the present invention covers such modifications and variations as come within the scope of the appended claims and their equivalents.

Now referring further to the figures, in which like numbers identify like elements, FIG. 1 shows an exemplary system 100 for producing one or more rubber products to be incorporated into one or more vehicle tires. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, industrial vehicles, mining vehicles and engineering machines. It is also contemplated that the products produced by the presently disclosed invention include full and partial tire treads such as those used in known retreading processes.

The heating medium may be selected from a plurality of suitable heating media. In some embodiments, the heating medium is nitrogen which has a negligible interdependence between the pressure and temperature. This attribute is suitable for embodiments of the invention in which pressure loads are realized at an operating temperature between 130° C. and 220° C.

The invention is characterized in that guidance protection means are positioned in the lower part of a center mold below the fan and the heater. This configuration, which is realized in several embodiments, suppresses the temperature rises that are attributable to blockage of the guidance means. As pressure changes during a cure cycle, the system effects homogenization of the temperature through the entire volume of the enclosure.

Now referring further to the figures, in which like numbers identify like elements, FIG. 1 shows a tire vulcanization system 100. System 100 includes an axially movable plate 116 and a fixed plate 118 that are connected by a flexible bladder 120. Counterplates 117, 119 anchor bladder 120 to respective plates 116, 118 along a circumference thereof. Bladder 120 and plates 116, 118 together delineate a fluid-tight enclosure 112 having a cavity 114 for containing a heating medium under pressure (e.g., nitrogen). Bladder 120 cooperates in a known manner with a rigid tire mold (not shown) intended to form an outer tire shape and sculpture.

A heater 124 is enveloped within cavity 114 and thus fully immersed in the heating medium during operation of system 100. Heater 124 is shown as a coil member having heating elements 124a generally formed in an annular shape, although it is understood that heater 124 may be selected from any known heater mechanism that is amenable to practice with the invention. Heating elements 124a are operable with a fan 126 having a diametrical extent delineated by a plurality of blades 126a. One or more blades 126a may have a high thermal conductive material at least partially integrated therewith, including but not limited to copper, aluminum and comparable and equivalent materials. A power source (such as an electric power source, not shown) that is in communication with heater 124 and fan 126 ensures uninterrupted control and operation of both elements within cavity 114.

A central portion of enclosure 112 includes an operating shaft 122 that is reciprocatable relative to a fixed mold along an axis X-X' of the enclosure. Operating shaft 122 effects exemplary axial movement of plate 116 between a vulcanization position in which bladder 120 abuts an inner wall surface $P_s'$ of tire P' and an extraction position in which bladder 120 collapses. A rotor 130 effects circumferential rotation of a support 125 that carries fan 126. As is known in the art, rotor 130 sufficiently actuates fan blades 126a so as to impart a prescribed tangential velocity to the ejected heating medium.

Figure 2A:
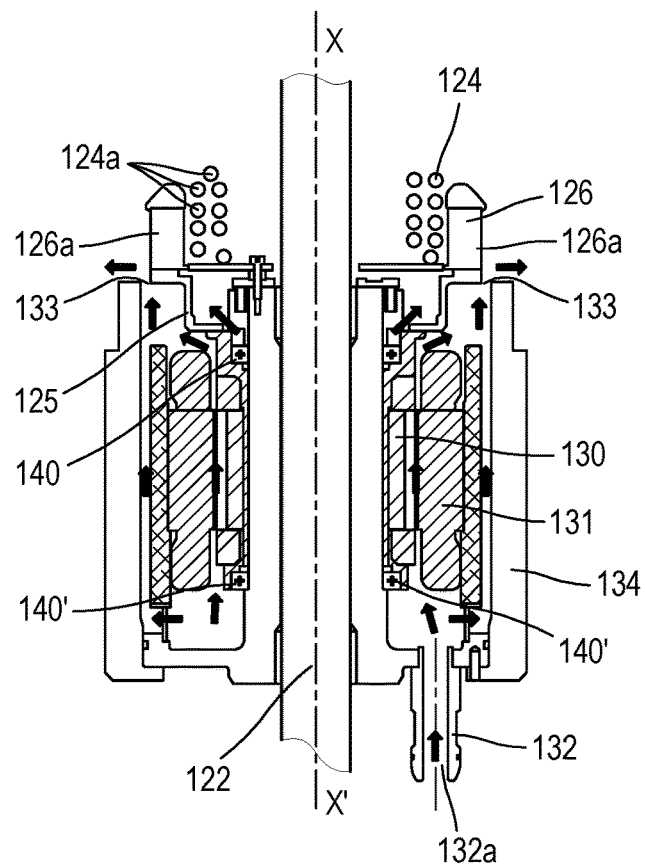
FIGS. 2A and 2B show the vulcanization system of FIG. 1 during respective supply and extraction of the heating medium.
Figure 2B:
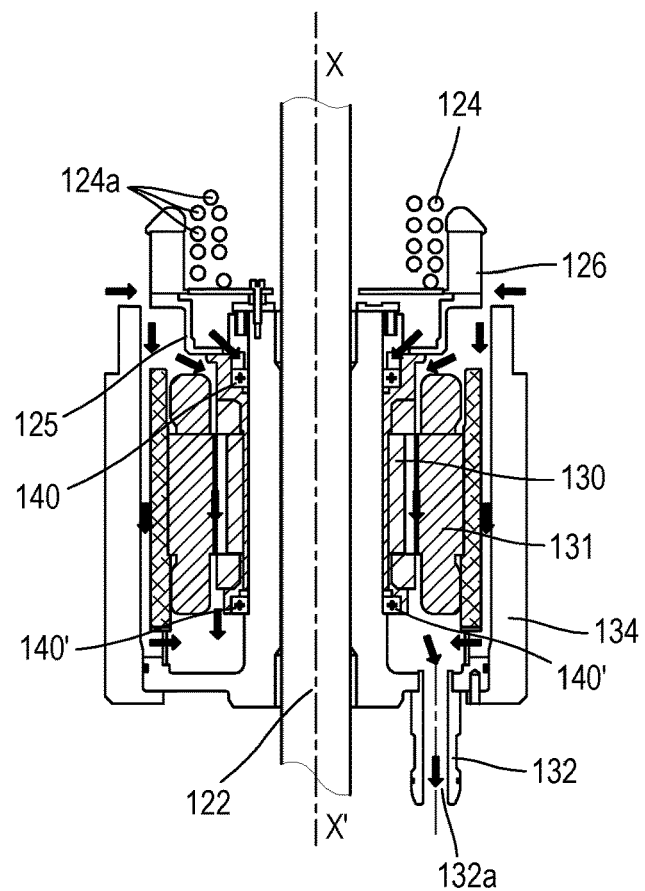

System 100 is further shown in FIGS. 2A and 2B. Upon commencement of a curing cycle in which a tire (P') is vulcanized in a mold for a predetermined duration under pressure (herein "duration under pressure"), one or more conduits 132 that are delineated in a stationary housing body 134 introduce the pressurized heating medium into cavity 114 (see FIG. 2A). The heating medium is introduced into the cavity as needed (e.g., continuously or periodically) to maintain sufficient heat transfer along bladder 120 and wall 120a thereof. A valve (not shown) may be provided for automatic introduction and extraction of the heating medium.

The heating medium is supplied from a heating medium supply (not shown) as is known in the art. Such heating medium supply may optionally include a preheating device that previously heats the heating medium prior to introduction thereof in cavity 114. It is understood that conduit 132 may include one or more conduits that are also employed for the extraction of the heating medium upon termination of a curing cycle (see FIG. 2B).

Guidance protection means are provided in the form of bearings 140, 140' that are positioned in a central portion of system 100 (e.g., at or near the center of bladder 120). Upper bearings 140 are disposed proximate heater 124 and fan 126 while lower bearings 140' are disposed opposite bearings 140 proximate an egress of the heating medium from conduits 132. As the heating medium is introduced through conduits 132, the rotation of fan 126 agitates the heating medium radially outwardly in the direction of the bladder 120 (i.e., along a path as shown by the arrows in FIG. 2A). Conduits 132 direct the heating medium toward exits 133 that are positioned obliquely relative to support 125. This configuration ensures uniform and effective circumferential distribution of the heating medium throughout cavity 114.

The same oblique configuration allows efficient extraction of the heating medium upon termination of the curing (i.e., along a path as shown by the arrows in FIG. 2B). Thus, both during the introduction and the extraction of the heating medium, bearings 140, 140' avoid contact with harmful compounds that are created during the curing cycle. Bearings 140, 140' and their placement also preserve the effectiveness of the curing cycle by suppressing the temperature rise attributable to the increase in resistant strains in the bearings. Bearings 140, 140' can include integral or supplemental exterior protection. In some embodiments, bearings 140, 140' include bearings that are sealed on both sides (e.g., 2RS type). In some embodiments, the bearings can be treated with a dry lubricant such as molybdenum disulfide or graphite disulfide.

Figures 3A, 3B:
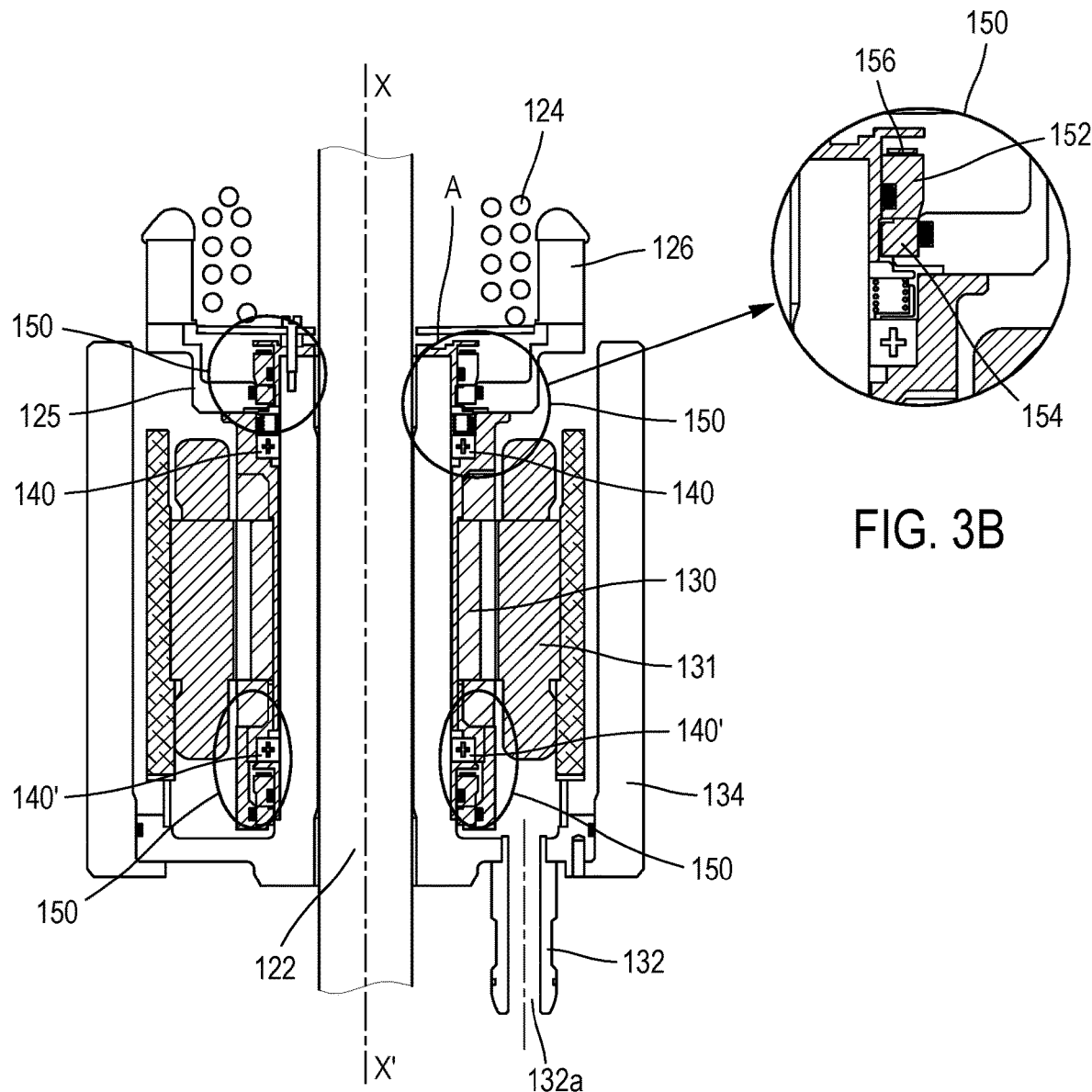
FIG. 3A is a sectional view of another vulcanization system of the invention.
FIG. 3B is an exploded view of circled portion A thereof.
Figure 4A:
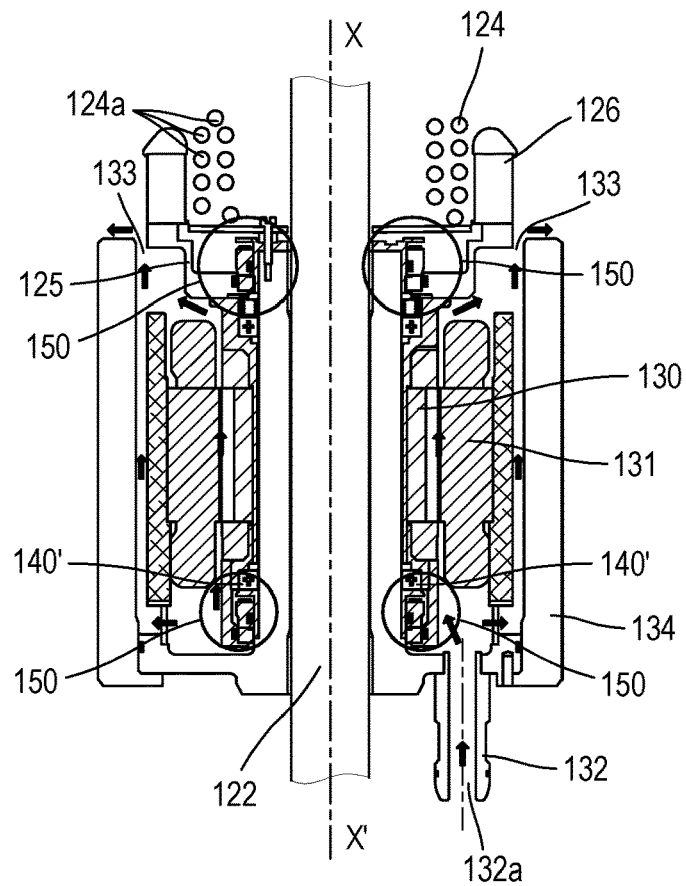
FIGS. 4A and 4B show the vulcanization system of FIG. 3A during respective supply and extraction of the heating medium.
Figure 4B:
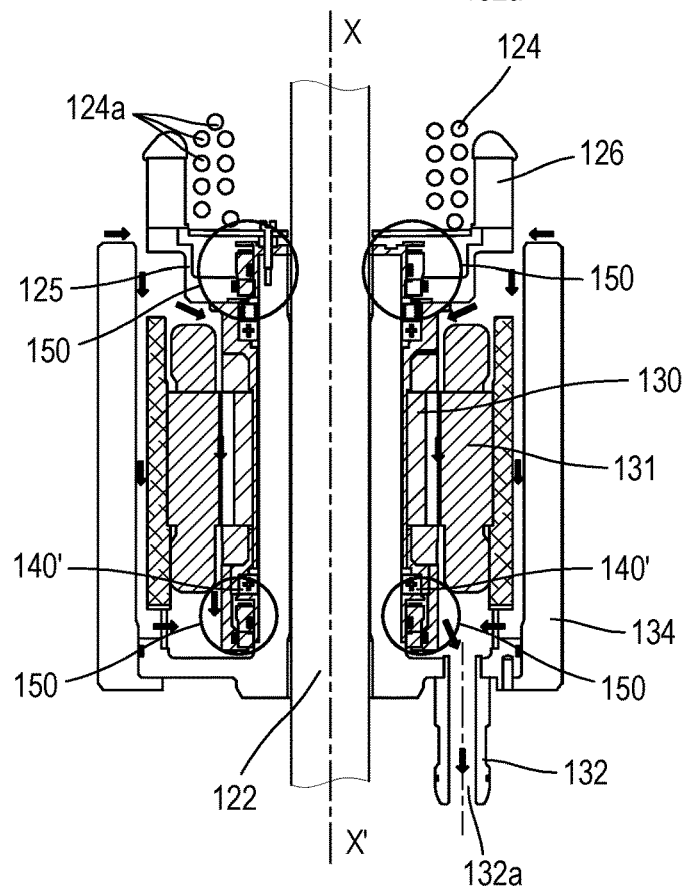

FIGS. 3A and 3B illustrate another embodiment of system 100 in which the guidance protection means are in the form of mechanical seals 150 in combination with the upper bearings 140 and/or the lower bearings 140'. In the example of FIG. 3A, mechanical seals 150 complement both the upper bearings 140 and the lower bearings 140'. Each seal 150 includes a stationary ring 152, a mobile grain 154 and spring washer 156 which maintains contact therebetween. Seal 150 prevents the passage of the heating medium during introduction into (i.e., along a path as shown by the arrows in FIG. 4A) and extraction from (i.e., along a path as shown by the arrows in FIG. 4B) cavity 114. The heating medium passes, rather, in an annular area between stator 131 and housing body 134. Seal 150 provides a sealing function that is decoupled from the rotation function, thereby resolving the problem of increased resistant forces in the bearings.

Figure 5:
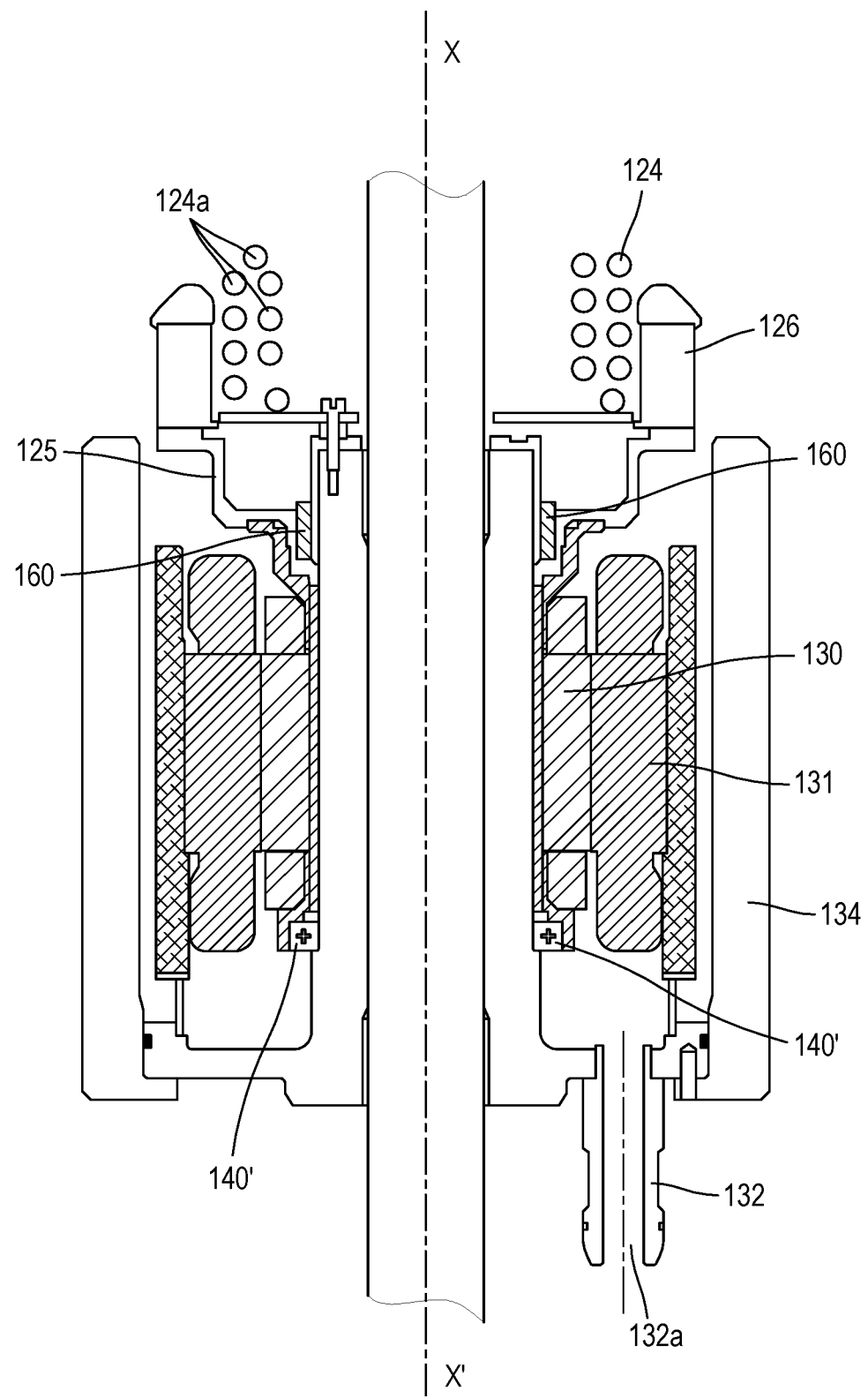
FIG. 5 is a sectional view of another vulcanization system of the invention.

FIG. 5 illustrates another embodiment of system 100 in which, in a position proximate support 125, plain bearings 160 replace upper bearings 140 and commensurate seals 150. Lower bearings 140' remain in a position distal to plain bearings 160. In the distal extent, optional seals that are comparable to seals 150 may complement bearings 140'. For some embodiments of the invention, plain bearings 160 are fabricated from a material that undergoes pressure loads at an operating temperature between 130° C. and 220° C. (e.g., one or more ceramic materials, high-performance plastics such as polyimide, etc.). In this embodiment, the lubricants can be used in a manner known in the art.

Figure 6:
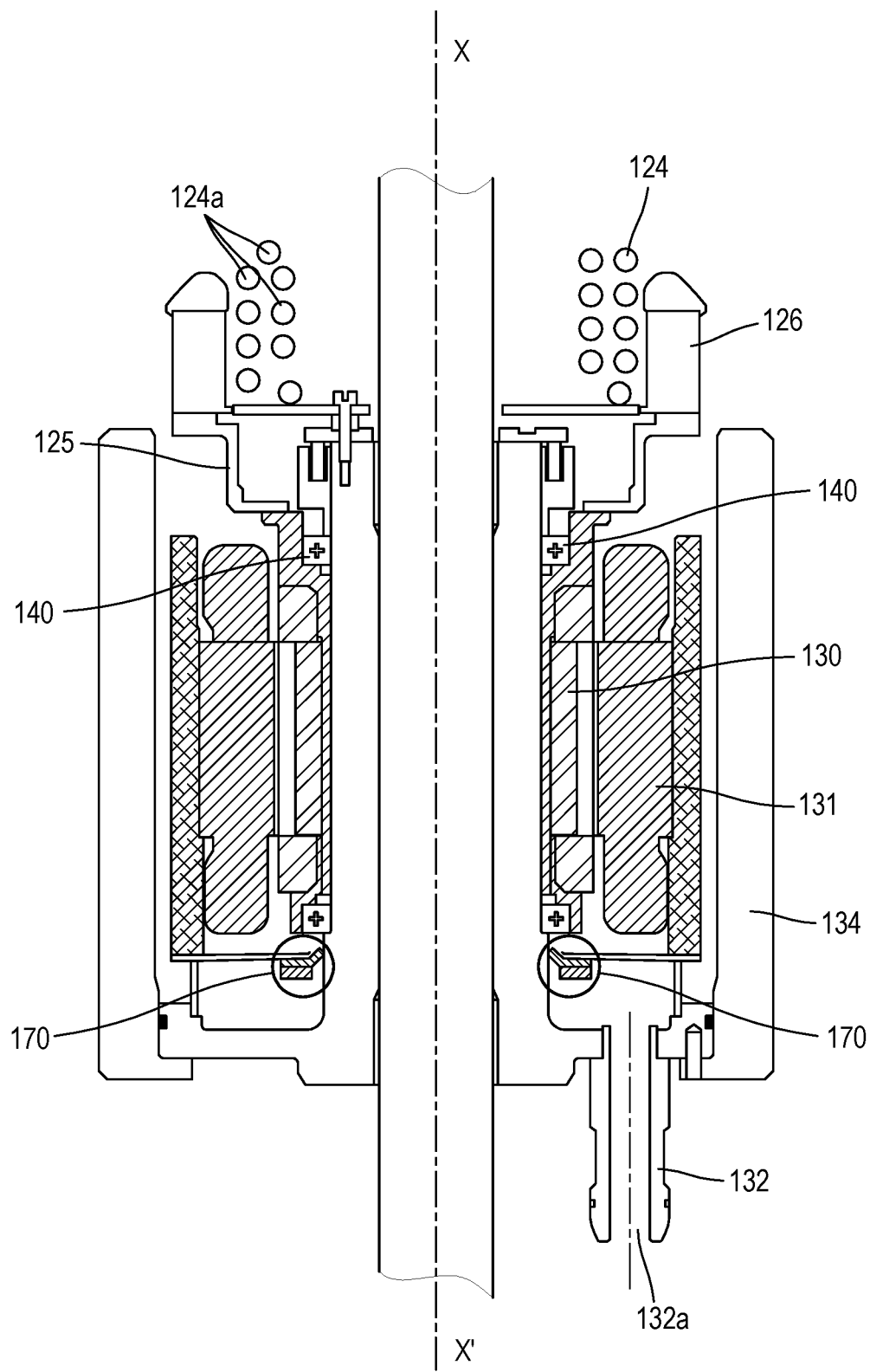
FIG. 6 is a sectional view of another vulcanization system of the invention.
Figure 7A:
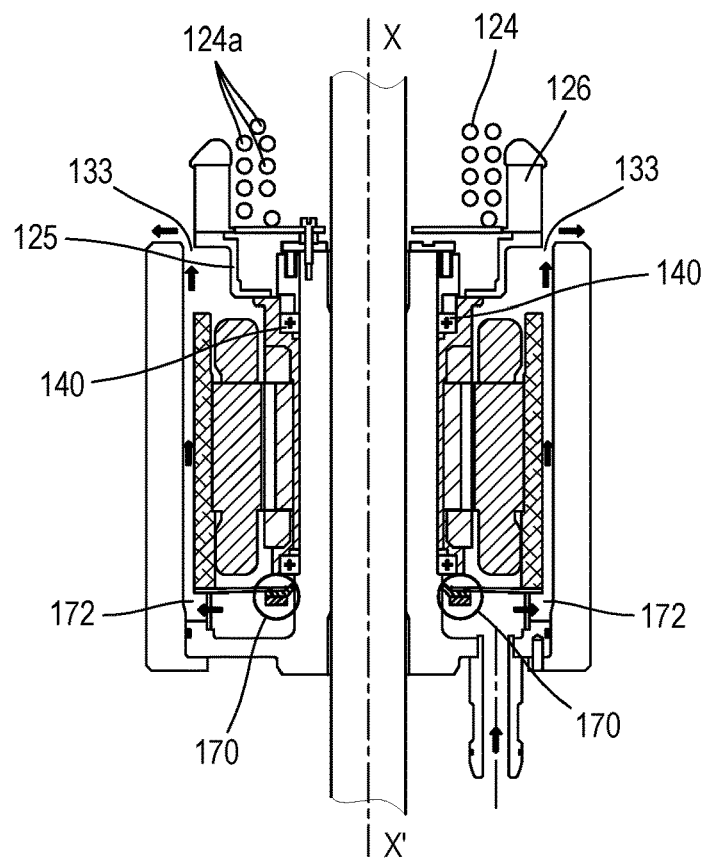
FIGS. 7A and 7B show the vulcanization system of FIG. 6 during respective supply and extraction of the heating medium.
Figure 7B:
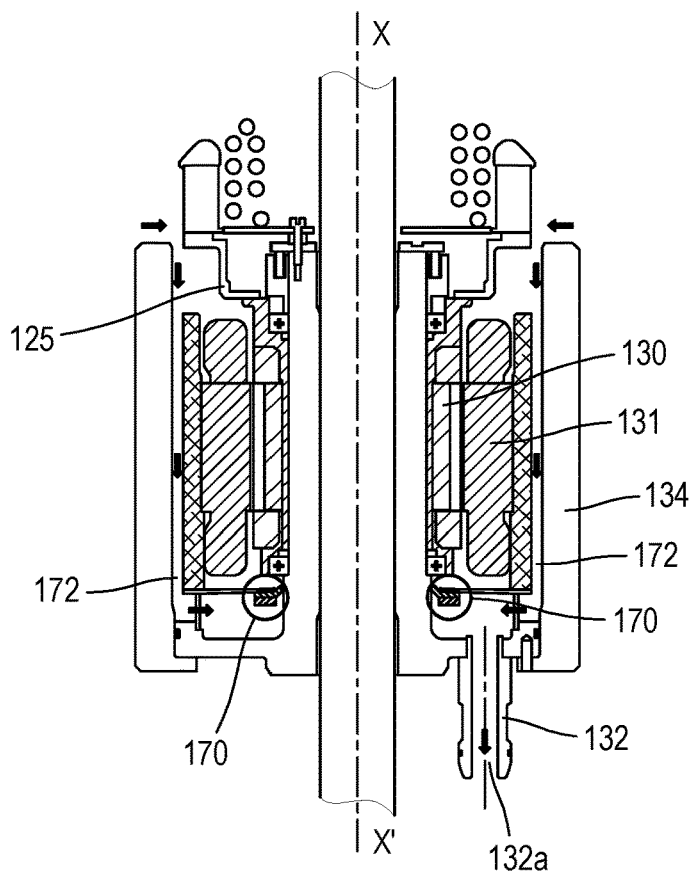

FIGS. 6, 7A and 7B provide another embodiment of system 100 wherein at least one joint 170 complements upper bearings 140 that are positioned proximate heater 124 and fan 126. Joints 170 may comprise generally flexible members that remain in flexible contact with housing body 134 and thereby complement protection of lower bearings 140'. In this configuration, as the heating medium is introduced into (i.e., along a path as shown by the arrows in FIG. 7A) and extracted from (i.e., along a path as shown by the arrows in FIG. 7B) cavity 114, joints 170 establish preferential passages 172 that isolate the heating medium to an annular region. The flow of the heating medium across the motor remains negligible, and upper bearings 140 remain essentially free of debris even with the use lubricants in a manner known in the art.

The invention solves the problem of internal resistance that affects the performance of the guidance means used in vulcanization systems. In some cases, a minimum film thickness can initially allow acceptable operating conditions. Ultimately, small perturbations in the operation of the bearings will lead to immobilization. With the disclosed invention, the proper functioning of the bearings is realized without making fundamental changes in the existing procedures.

Using the disclosed invention, heat flux can be increased in a controlled manner during a curing cycle to ensure sufficient heat flux for vulcanization. The energy which is necessary for vulcanization of a tire is the energy that carries the tire from its initial temperature (e.g., room temperature) to the desired temperature of vulcanization. Power is provided internally by the heating medium and on the outside by the mold. By preserving the operability of the guidance, the system homogenizes throughout a period during which the heating medium is pressurized. The invention therefore sustains vulcanization in a stabilized system.

The dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" may include one or more steps performed at least by one electronic or computer-based apparatus having a processor for executing instructions that carry out the steps.

The terms "at least one" and "one or more" are used interchangeably. Ranges that are described as being "between a and b" are inclusive of the values for "a" and "b."

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

The invention claimed is:

1. A tire vulcanization system for regulating a temperature of a heating medium, the system comprising:
   a bladder disposed within a tire to be vulcanized and defining a cavity, wherein the heating medium circulates, with a fan and a heater being immersed in the heating medium and the heater has one or more heating elements which supply energy to the heating medium before the heating medium exits the bladder along an output path, and with a shaft being concentric with an axis X-X' of the cavity, and with a controllable motor driving the shaft; and
   one or more bearings positioned in a central portion of the system and below the fan and the heater so that, as the heating medium is introduced into the cavity, the fan agitates the heating medium radially outwardly in the direction of the bladder and directs the heating medium toward exits that are positioned obliquely relative to a support that carries the fan.

2. The tire vulcanization system of claim 1, wherein the heating medium in the cavity is pressurized at an operating temperature between about 130° C. and about 220° C.

3. The tire vulcanization system of claim 1, wherein the bearings include upper bearings disposed proximate the heater and the fan and lower bearings disposed opposite the upper bearings and proximate an egress of the heating medium from one or more conduits.

4. The tire vulcanization system of claim 3, wherein the system further comprises one or more mechanical seals in combination with at least one of the upper bearings and the lower bearings.

5. The tire vulcanization system of claim 1, wherein the bearings include one or more plain bearings disposed proximate the support and lower bearings disposed opposite the plain bearings and proximate an egress of the heating medium from one or more conduits.

6. The tire vulcanization system of claim 5, wherein the plain bearings are fabricated from a material that undergoes pressure loads at an operating temperature between 130° C. and 220° C.

7. The tire vulcanization system of claim 3, wherein the system further comprises at least one joint comprising a generally flexible member that remains in flexible contact with a housing body disposed distal to the motor such that the joint establishes passages that isolate the heating medium to an annular region between the motor and the housing body and connect to the exits.

8. The tire vulcanization system of claim 1, wherein the bearings are treated with a dry lubricant.

9. The tire vulcanization system of claim 8, wherein the dry lubricant is selected from the group consisting of molybdenum disulfide and graphite disulfide.

10. The tire vulcanization system of claim 1, wherein the heating medium comprises nitrogen.

11. The tire vulcanization system of claim 1 further comprising a mold within which the tire is vulcanized.

12. A method for vulcanizing a tire, the method comprising steps of:
   providing the tire vulcanization system of claim 11, and
   vulcanizing the tire in the mold for a predetermined duration under pressure.

\* \* \* \* \*